United States Patent [19]

Jeng et al.

[11] Patent Number: 4,850,026

[45] Date of Patent: Jul. 18, 1989

[54] CHINESE MULTIFONT RECOGNITION SYSTEM BASED ON ACCUMULABLE STROKE FEATURES

[75] Inventors: Bor-Shenn Jeng; Gan-How Chang; Kuang-Yao Chang; Jang-Keng Lin; Tsann-Shyong Liu; Rong-Hauh Ju; Hsien-Ju Chang; Yung-Lai Wu; Chih-Yen Yang; Jei-Shyong Huang; Shang-Ju Hsieh; Chun-Chu Wu, all of Tao Yuan Hsien, Taiwan

[73] Assignee: Telecommunications Laboratories Dir. Gen'l of Telecom. Ministry of Communications, Taiwan

[21] Appl. No.: 218,489

[22] Filed: Jul. 5, 1988

Related U.S. Application Data

[63] Continuation-in-part of Ser. No. 107,637, Oct. 13, 1987, abandoned.

[51] Int. Cl.[4] .............................................. G06K 9/18
[52] U.S. Cl. .......................................... 382/21; 382/14; 382/30; 382/47
[58] Field of Search .................... 382/10, 14, 18, 20, 382/25, 56, 13, 16, 21, 22, 30, 47

[56] References Cited

U.S. PATENT DOCUMENTS

| | | | |
|---|---|---|---|
| 4,177,448 | 12/1979 | Brayton | 382/25 |
| 4,365,235 | 12/1982 | Greanias et al. | 382/13 |
| 4,516,262 | 5/1985 | Sakurai | 382/22 |
| 4,524,456 | 6/1985 | Araki et al. | 382/56 |
| 4,545,067 | 10/1985 | Juvin et al. | 382/21 |
| 4,573,196 | 2/1986 | Crane et al. | 382/13 |
| 4,607,386 | 8/1986 | Morita et al. | 382/13 |
| 4,684,926 | 8/1987 | Yong-Min | 382/56 |
| 4,685,142 | 8/1987 | Ooi et al. | 382/13 |
| 4,758,979 | 7/1988 | Chiao-Yueh | 382/13 |

Primary Examiner—Leo H. Boudreau
Assistant Examiner—Donald J. Daley
Attorney, Agent, or Firm—Wenderoth, Lind & Ponack

[57] ABSTRACT

A Chinese multifont recognition system, in which a scanner can input Chinese character pattern data into a recognition system to recognize all characters to complete the chinese input operation. The recognition system can recognize various printed fonts and chinese characters in various sizes. The recognition method is arranged that all the Chinese characters to be recognized are to be put in the system; all the features of a Chinese character are extracted, and stored in a feature data base. Later, any input Chinese character will recognized in accordance with the data base. Since it is a technique of extracting the features of a character pattern, the system can recognize the multifont Chinese characters. If it is necessary to expand the number of characters in the data base established originally, a character feature learning system may be used for storing new characters therein.

4 Claims, 15 Drawing Sheets

FIG. 8A
*(TABLE 1)*

悵 惜 悼 惆 惕 惘 惟 悴 惚 惇
戚 戛 掠 控 捲 掖 探 接 捷 捧
掘 措 挋 掩 掉 掃 掛 捫 推 掄
授 掙 採 掏 排 掏 掀 捻 捩 捨
捺 敝 敖 救 教 敗 啓 敏 敘 敕
敔 斜 斛 斬 族 旋 旌 旎 晝 晚

FIG. 8B
(TABLE 2)

| 悙 | 惚 | 悸 | 惟 | 惕 | 惕 | 悼 | 惜 | 悵 |
|---|---|---|---|---|---|---|---|---|
| 捧 | 捷 | 接 | 探 | 披 | 捲 | 控 | 掠 | 戚 |
| 掄 | 推 | 捫 | 掛 | 掃 | 掉 | 掩 | 握 | 措 | 掘 |
| 捨 | 挨 | 捻 | 掀 | 掏 | 排 | 掬 | 採 | 掙 | 授 |

| 悙 | 惚 | 悸 | 惟 | 惕 | 惕 | 悼 | 惜 | 悵 |
|---|---|---|---|---|---|---|---|---|
| 捷 | 接 | 探 | 披 | 捲 | 控 | 掠 | 戛 | 戚 |
| 推 | 捫 | 掛 | 掃 | 掉 | 掩 | 握 | 措 | 掘 |
| 挨 | 捻 | 掀 | 掏 | 排 | 掬 | 採 | 掙 | 授 |

FIG. 8C
(TABLE 3)

悵 惜 悼 惘 惕 惆 惟 悴 惚 惇
戚 戛 掠 控 捲 挍 探 接 捷 捧
掘 措 握 掩 掉 掃 掛 捫 推 掄
授 掙 採 掬 排 掏 掀 捻 捩 捨

悵 惜 悼 惘 惕 惆 惟 悴 惚 惇
戚 戛 掠 控 捲 挍 探 接 捷 捧
掘 措 握 掩 掉 掃 掛 捫 推 掄
授 掙 採 掬 排 掏 掀 捻 捩 捨

悵 惜 悼 惘 惕 惆 惟 悴 惚 惇
戚 戛 掠 控 捲 挍 探 接 捷 捧
掘 措 握 掩 掉 掃 掛 捫 推 掄
授 掙 採 掬 排 掏 掀 捻 捩 捨

FIG. 8D
(TABLE 4)

嘉 言 錄
耐 心 信 心 決 心
是 每 一 個 人
事 業 成 功 的
基 本 精 神

FIG. 8E (TABLE 5)

| STORING BYTE | SYMBOL | MEANING |
|---|---|---|
| 00000001 | 1 | NO STROKE |
| 00000010 | 2 | VERTICAL STROKE |
| 00000100 | 4 | STROKE ALONG 135 DIRECTION |
| 00001000 | 8 | HORIZONTAL STROKE |
| 00010000 | 16 | STROKE ALONG 45 DIRECTION |

$$A^{*}1 = \begin{pmatrix} 0 & 0 & 87 & 88 & 0 & 7 & 0 & 0 \\ 5 & 25 & 116 & 112 & 22 & 19 & 0 & 0 \\ 0 & 16 & 116 & 112 & 11 & 8 & 8 & 0 \\ 4 & 4 & 161 & 133 & 4 & 7 & 6 & 2 \\ 0 & 15 & 140 & 116 & 13 & 0 & 0 & 0 \\ 6 & 11 & 116 & 112 & 18 & 22 & 0 & 0 \\ 7 & 0 & 116 & 112 & 0 & 21 & 14 & 3 \\ 0 & 0 & 58 & 28 & 0 & 0 & 0 & 0 \end{pmatrix}$$

$$A^{*}2 = \begin{pmatrix} 0 & 0 & 0 & 9 & 6 & 0 & 0 & 0 \\ 0 & 14 & 26 & 8 & 8 & 10 & 4 & 0 \\ 0 & 0 & 12 & 10 & 12 & 5 & 12 & 9 \\ 2 & 4 & 4 & 42 & 51 & 4 & 7 & 8 \\ 0 & 0 & 8 & 34 & 19 & 53 & 0 & 0 \\ 0 & 3 & 5 & 8 & 8 & 52 & 63 & 0 \\ 3 & 4 & 0 & 8 & 8 & 0 & 52 & 31 \\ 0 & 0 & 0 & 2 & 2 & 0 & 0 & 0 \end{pmatrix}$$

$$A^{*}3 = \begin{pmatrix} 0 & 0 & 0 & 14 & 0 & 0 & 0 & 0 \\ 6 & 20 & 8 & 8 & 17 & 21 & 0 & 0 \\ 0 & 8 & 8 & 8 & 9 & 10 & 0 & 0 \\ 58 & 116 & 166 & 145 & 116 & 116 & 10 & 87 \\ 0 & 13 & 21 & 11 & 10 & 0 & 0 & 0 \\ 0 & 10 & 8 & 8 & 18 & 25 & 0 & 0 \\ 5 & 0 & 8 & 8 & 0 & 27 & 27 & 0 \\ 0 & 0 & 3 & 2 & 0 & 0 & 0 & 0 \end{pmatrix}$$

$$A^{*}4 = \begin{pmatrix} 0 & 0 & 0 & 6 & 6 & 0 & 0 & 0 \\ 0 & 3 & 12 & 9 & 14 & 29 & 37 & 0 \\ 0 & 4 & 7 & 10 & 8 & 33 & 9 & 7 \\ 2 & 4 & 4 & 85 & 13 & 4 & 9 & 4 \\ 0 & 0 & 53 & 63 & 57 & 6 & 0 & 0 \\ 0 & 39 & 57 & 8 & 10 & 10 & 12 & 0 \\ 19 & 48 & 0 & 8 & 8 & 0 & 13 & 13 \\ 0 & 0 & 0 & 4 & 2 & 0 & 0 & 0 \end{pmatrix}$$

CHINESE MULTIFONT RECOGNITION SYSTEM BASED ON ACCUMULABLE STROKE FEATURES

This is a continuation-in-part of now abandoned application Ser. No. 107,637 filed Oct. 13, 1987.

BACKGROUND OF THE INVENTION

The conventional Chinese input method to a computer is usually done by means of a keyboard; that input method is rather difficult to learn and operate aside from the slow operation speed. If the Chinese characters can be put into a computer through an intelligent method instead of using the conventional input method, the Chinese input operation in term s of speed and operation would be much more satisfactory; the so-called intelligent method is that the Chinese character patterns are to be put into a computer by means of scanning device, and then are recognized automatically by the computer. According to the present invention, the problem of putting Chinese characters into a computer can be solved; moreover, the multifont Chinese characters can also be put into a computer. In the meantime, it can recognize characters of different sizes. The system, according to the present invention, is capable of recognizing 5400 characters in each font. Anyway, the present invention enables a computer to have the capability of recognizing the Chinese character, and to recognize a new character through a character feature learning system. It is deemed that the present invention is valuable in recognizing Chinese characters.

SUMMARY OF THE INVENTION

The system, according to the present invention, can simultaneously recognize various fonts of Chinese characters. The system comprises the major hardware components such as a host processor with two expander boards, some software, and a scanning input device, etc. The host processor is used to control the scanner, to preprocess the image data extracted from the scanner, and to transfer the data to the expander boards. One expander board is called the feature extractor, the other is called a matching recognizer. The system, according to the present invention, can automatically recognize many specific printed Chinese fonts (such as the Boldface style, the MING-Dynasty style, the Formal style and the Sung-dynasty style) in any size (the resolution of the computer character may be 64 * 64, 96 * 96, 128 * 128, etc.).

The recognition method of the system comprises a character learnign module and a character recognition module. In the character learning module, the Chinese characters recognized are to be put into the system, and then the computer will extract the features of every character and store them so as to establish a feature data base. In the character recognition module, any input Chinese character can be matched with the character pattern features in the data base so as to recognize the character. The number of Chinese characters originally stored in the data base may be expanded by receiving new characters in the recognition system through the feature learning system. In fact, the technique of extracting the Chinese character features, according to the present invention, has greatly been advanced. The features include both the identical and different features of various Chinese fonts so as to recognize the multifont Chinese characters. The features of various Chinese fonts include both the identical and the different features which can be accumulated by a logical "OR" operation, so as to recognize multifont Chinese characters.

BRIEF DESCRIPTION OF THE DRAWINGS

FIG. 8A (Table 1) illustrates Ming style characters in various sizes.

FIG. 8B (Table 2) illustrates Formal style characters in various sizes.

FIG. 8C (Table 3) illustrates Boldface style characters in various sizes.

FIG. 8D (Table 4) illustrates various character styles in various sizes.

FIG. 8E (Table 5) illustrates a feature encoding table.

FIG. 9 illustrates chinese character pattern "*".

FIGS. 10A–10C illustrate the distribution of stroke length of Chinese character "*" along four directions A1, A2, A3, A4.

FIG. 11 illustrates a reduced matrix of FIG. 10.

FIG. 12 illustrates a feature matrix of "*".

FIG. 13 illustrates a two feature matrix of "*" in learning set.

FIG. 14 illustrates a template feature matrix generated by the matrix in FIG. 8.

DETAILED DESCRIPTION

Figure 1:
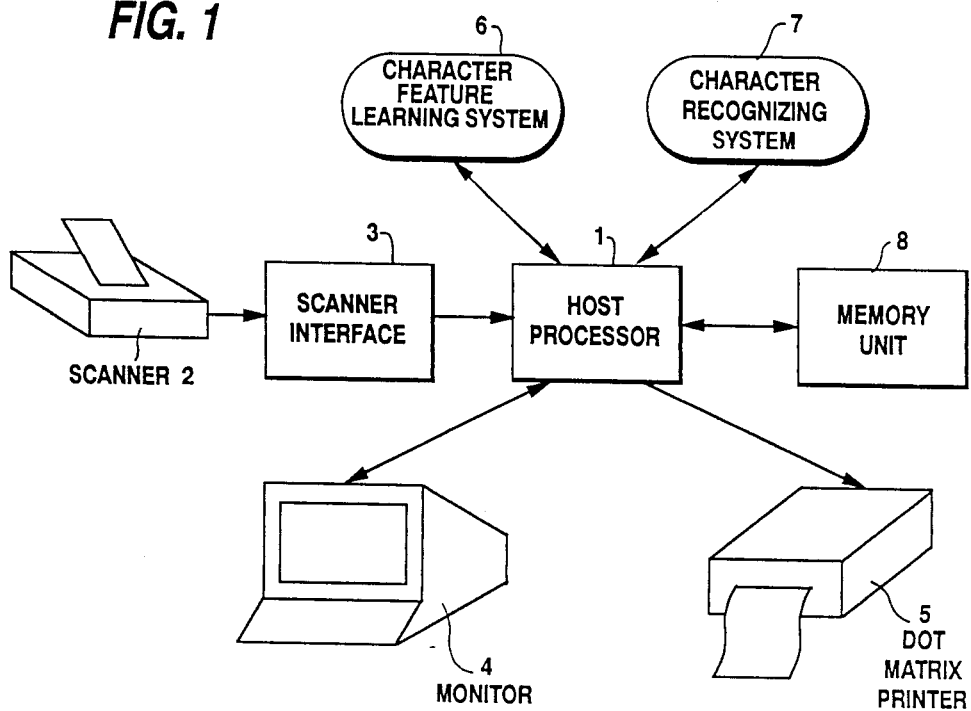
FIG. 1 is a block diagram of a Chinese multifont recognition system according to the present invention.

FIG. 1 illustrates the modules in the system of the present invention, which comprises a host prosessor 1, a scanner 2, a scanner interface card 3, a monitor 4, a dot-matrix printer 5, a character feature learning system 6, a character recognizing system 7, and a memory unit 8, etc. Except for elements 6 and 7, all of the system elements are commercially available items.

Each of the aforesaid modules is further described as follows:

The host processor 1 controls the executions of the various modules.

The scanner 2 is used to convert the printed Chinese character which is shown in FIG. 8A (Table 1), FIG. 8B (Table 2), FIG. 8C (Table 3), and FIG. 8D (Table 4) into a digital image.

The scanner interface card 3 is a hardware interface to provide the scanner 2 and the host processor 1 with an inter-communicatio means for data transmission.

The monitor 4 is a graphic terminal to display the resultant character pattern recognized.

The Dot-matrix printer 5 is used for printing a beautiful resultant character pattern.

The character feature learning system 6:

It is a module to let the computer learn the various printed Chinese character pattern (or style) to be recognized, and extract the features of each character, which are collected together as a database. If the whole characters are stored instead of features, a considerable memory space will be required; moreover, to match and recognize a whole single character would take a longer time; therefore, a small number of features of each character that can fully represent it are extracted to be used as a standard by the character recognition system in recognizing a character or characters.

The character recognizing system 7:

It is a module, of which the function is to recognize the character or characters on the input paper, and to have the recognized result shown in the monitor or the printer.

The memory unit 8 is used to store programs and data.

Figure 4:
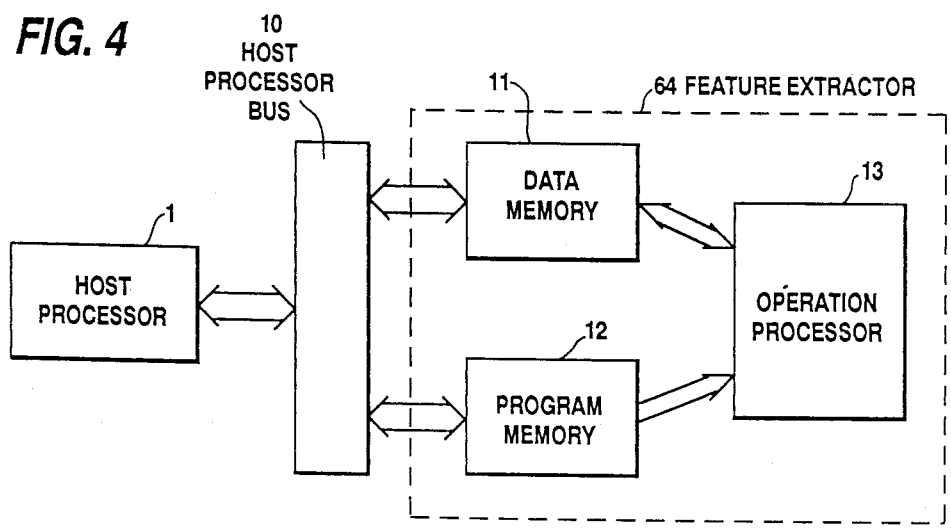
FIG. 4 is a block diagram of the feature extractor of the present invention.
Figure 2:
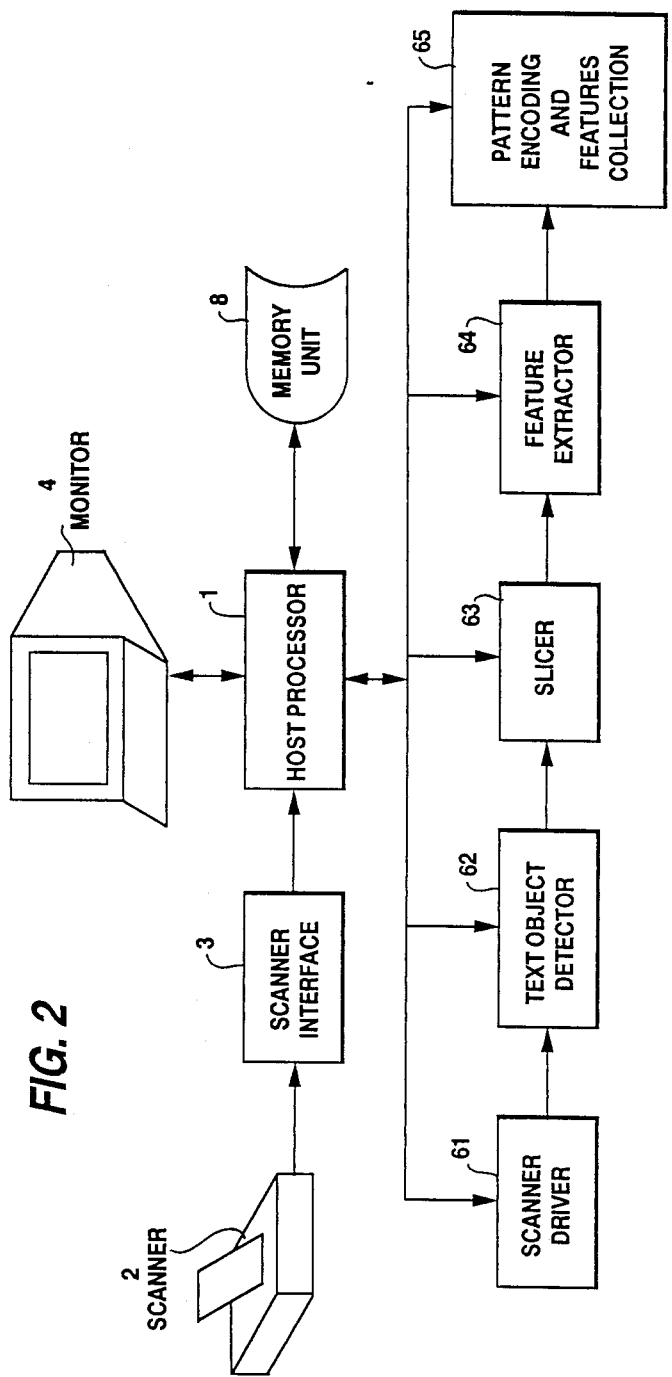
FIG. 2 is a block diagram of the character feature learning system according to the present invention.

FIG. 2 illustrates the character feature learning system of the present invention, in which the scanner driver 61 is used for adjusting and processing the printed Chinese character to be input from the scanner 2 so as to obtain the Chinese computer character pattern desired. The aforesaid adjusting and processing procedures includes to set a given resolution on the resolution selector for the scanner 2, to indicate each pixel on the papers by using the gray level values ranging from 0–255, to simplify the aforesaid value with the adaptive threshold method into a data range 0–1, i.e., "1" stands for a back dot and "0" stands for a white dot so as to separate the strokes of a character from the white background of the paper. The scanner driver module 61 can make sure to obtain a better quality of Chinese computer characters from various kinds of scanners so as to facilitate the later recognition operation much easy to obtain a satisfactory result. The real difficulty in this step during the pre-processing is the Chinese character that has complicated strokes, in which the gray level value among the strokes would be higher than the pixels of the distal end of a stroke, of the edge portion, and of thin strokes; therefore, the best method to solve the aforesaid problem is to use the dynamic region dividing method in accordance with the complication extent; then, give each of the divided regions a threshold in the histogram through the adaptive threshold method so as to eliminate the broken line, to correct the deviated point, and to remove any impurity caused by the scanner itself and in order to obtain a clear and complete character pattern. The function of the text object detector 62 is to find out the location of each character in each line from each of the input digital images. The slicer 63 is used for cutting and dividing each character in a digital image, and the cut parts thereof will be read into the memory unit 8 in accordance with the specific resolution so as to generate a character pattern in the same size. The feature extractor 64 is the most important part of the present invention. The extractor can analyze and extract the features to represent multifont Chinese characters. In addition to representing the characteristics of the character pattern, the features are accumulable. For example, the Chinese character "永" has various fonts as a Formal style, e.g. - Ming style, and Sung-dynasty style, etc. These multifont characters can be learned seperately, i.e. extracting the features for each of them, then combining these features into a single feature by a logical addition. The structure of the feature extractor is shown in FIG. 4. In order to have the operation done at a high speed, the host processor is not used for doing the operation; instead, the feature-extracting operation is to be done by using an operation processor 13. The high speed CPU (TMS 32010) in processor 13 can receive the cut chinese character pattern from the host processor 1 via the host processor bus 10, and then it extracts the features of the character pattern by means of a feature-extracting program, and the features extracted are transmitted back to the data memory 11 controlled commonly by the host processor 1 and the operation processor 13. The program memory 12 is used for storing the feature program instructions.

Figure 3:
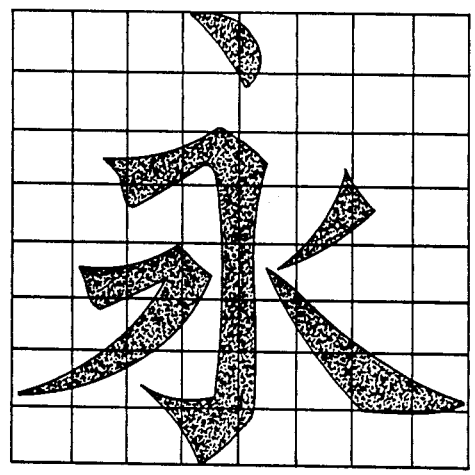
FIG. 3 illustrates a Chinese character being disassembled into m * n positions according to the present invention.
Figure 5:
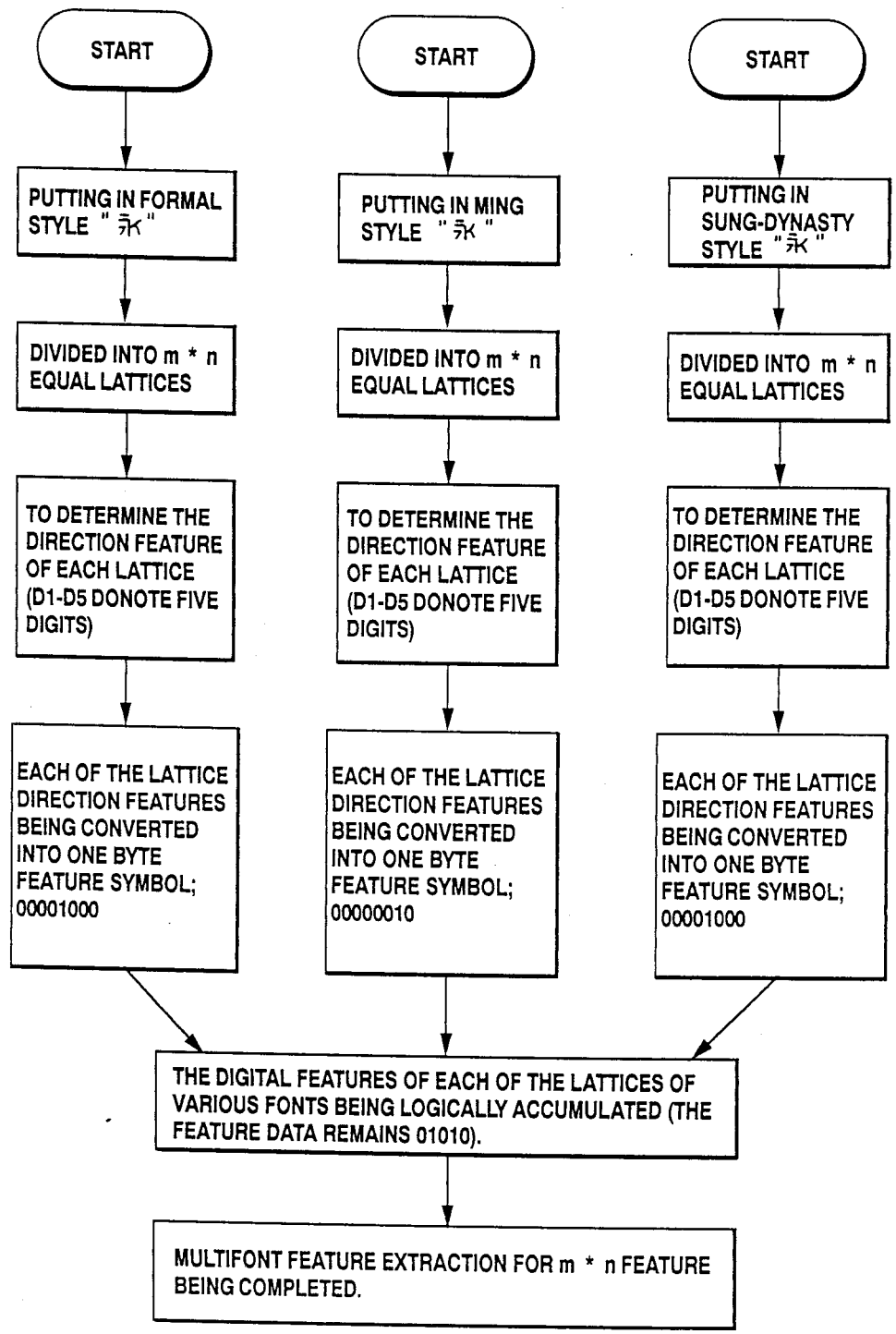
FIG. 5 is the operation flow chart of the feature extractor of the present invention.

FIG. 5 is an operation flow chart for feature extraction; for example, a Formal style of a chinese character "永" should be divided into m * n lattices (e.g. 8 * 8 or more) as shown in FIG. 3; then, calculate the direction classification of every small lattice. Sine the strokes of the Chinese character have four writing directions, i.e., ⟷, ↑, ↘, and ↗, which are represented with four one-bit binary data, i.e., D1, D2, D3 and D4. The blank portions are represented with one binary data D5. According to the aforesaid principle, a total of m * n data can be obtained out of the m * n lattices, which are the initial feature data of a Chinese character. In order to let the features have an accumulable property so as to simplify the amount of the feature data, the initial feature data have to be converted into symbols before being further processed; in other words, the digital type of feature data has to be converted into a series of "0" and "1" to represent the digital features so as to simplify the data into the bit units. The various printed character styles are to be learned by the learning system, and the features learned can be accumulated by means of Logic "OR" so as to save storage space. After the features are extracted, the features in each of m * n lattices of a character can be stored in a memory by means of only five bits, which can contain the features of various printed character patterns within that lattice, and which can be used to recognize various printed Chinese characters. The last step of the character feature learning is the pattern encoding and features collection 65. The character pattern learned has to be converted into inner codes via a character code converting table, and stored in a memory unit. All the Chinese character pattern features learned and the corresponding inner codes thereof are stored in a memory unit 8 to establish a character data base, which is to be used by the character recognition system.

Figures 9, 10A:
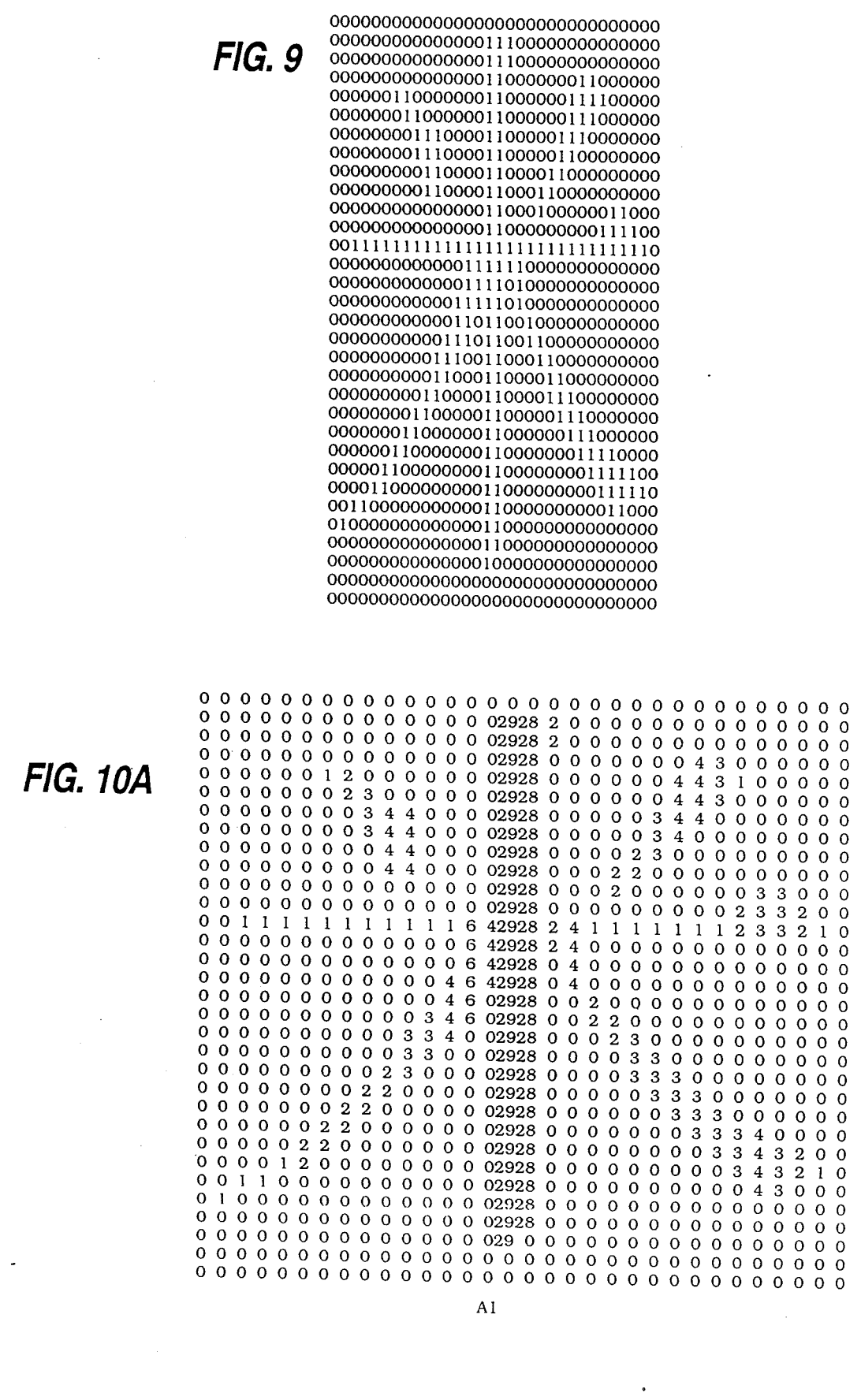
Figure 10B:
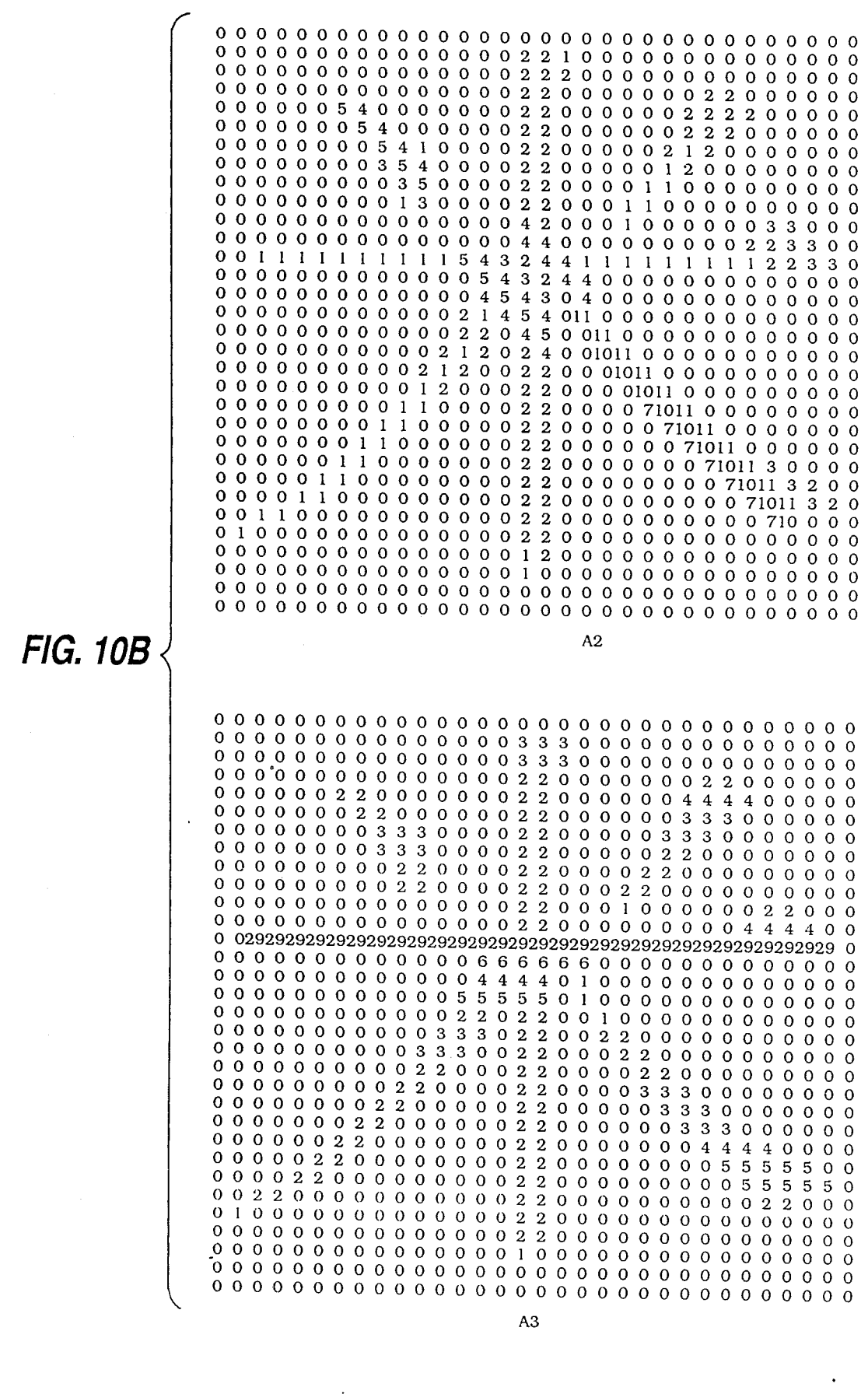
Figure 10C:
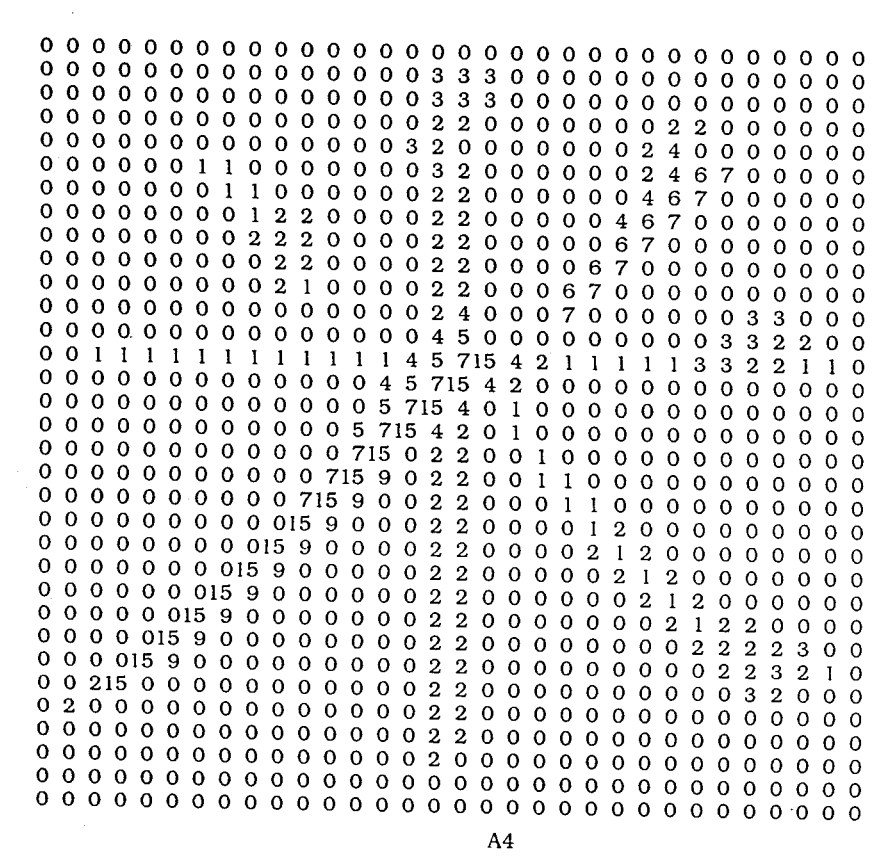

A brief flow chart of the feature extractor 64 is shown in FIG. 5. The detailed principal is that the input of the feature extractor 64 is a normalized character pattern. An example, "永" in FIG. 9 will be taken. This word has a resolution of 32×32, or 32×32 pixels. At the very beginning of feature extraction, direction expansions along the 4 directions are evaluated. 4 matrices A1–A4 are obtained in which A1 is along vertical direction "↑" and is for measurement of stroke length, and A 2 measures along 135 direction "↘", and A 3 and A 4 measures similarly and respectively along horizontal and 45 direction. See FIG. 10A–10C. Then, each matrix is divided into 8×8 equal parts, and average value of each part or every 4×4 pixels are calculated and thereby generates 4 new matrices, i.e., four reduced matrices A1*–A4* are generated. See FIG. 11.

Figures 12, 13, 14:
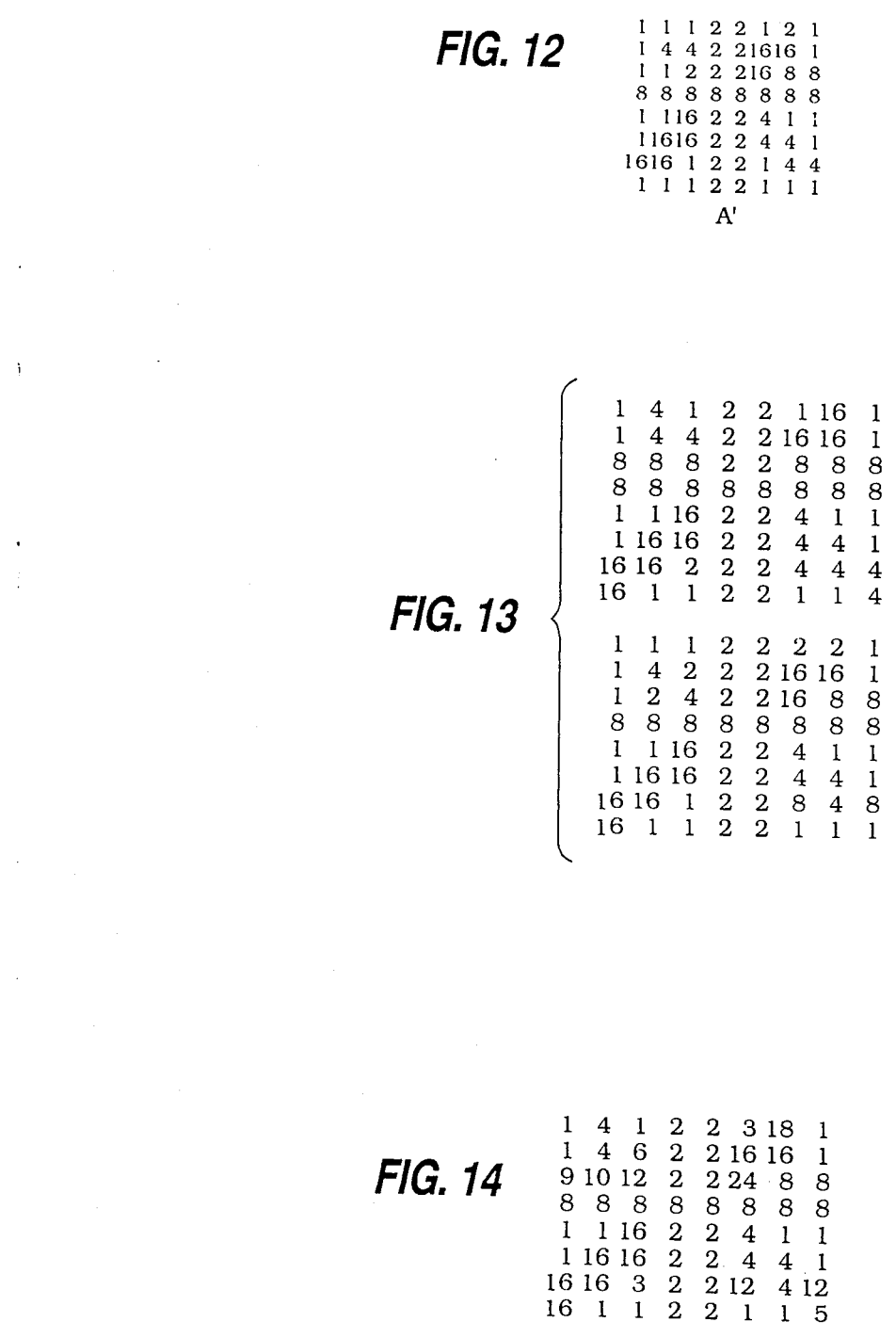

Then, the feature matrix of "永" is evaluated from A1*–A4* as shown in FIG. 12. Every location value (x, y) of the four reduced matrices is compared, and the greatest one at each location will become the representative value. In other words, it is the stroke direction and feature in this location. For example, A3 has the greater value in location (4,4) among A1*–A4*, and thus, this location has a horizontal direction "↔", and according to feature encoding table, its feature symbol is 8 or in storing byte, 00001000. By repeat comparisons, stroke direction features of 8×8 locations, i.e., feature matrix in FIG. 12 are obtained, and feature extraction is completed.

Supposed there is a different font of "*", a different matrix is deduced. The two different feature matrices shown in FIG. 13 can be combined into one. Firstly, the two matrices, after operation of logical OR, are turned into a template feature matrix. This template feature matrix can recognize the word "*" which is composed of two fonts. Based on this principal, feature matrices of various fonts can be combined into a template feature matrix to satisfy the recognition requirement. The template feature matrix is the input of pattern encoding and feature collection 65. The code is then searched from a Chinese Big-5 Standard Code Table. For example, "*" has a two bytes Chinese code "A6CC". After searching, the code must be stored along with the template feature matrix in a character data base. The learning of the word "*" is finally completed.

Figure 6:
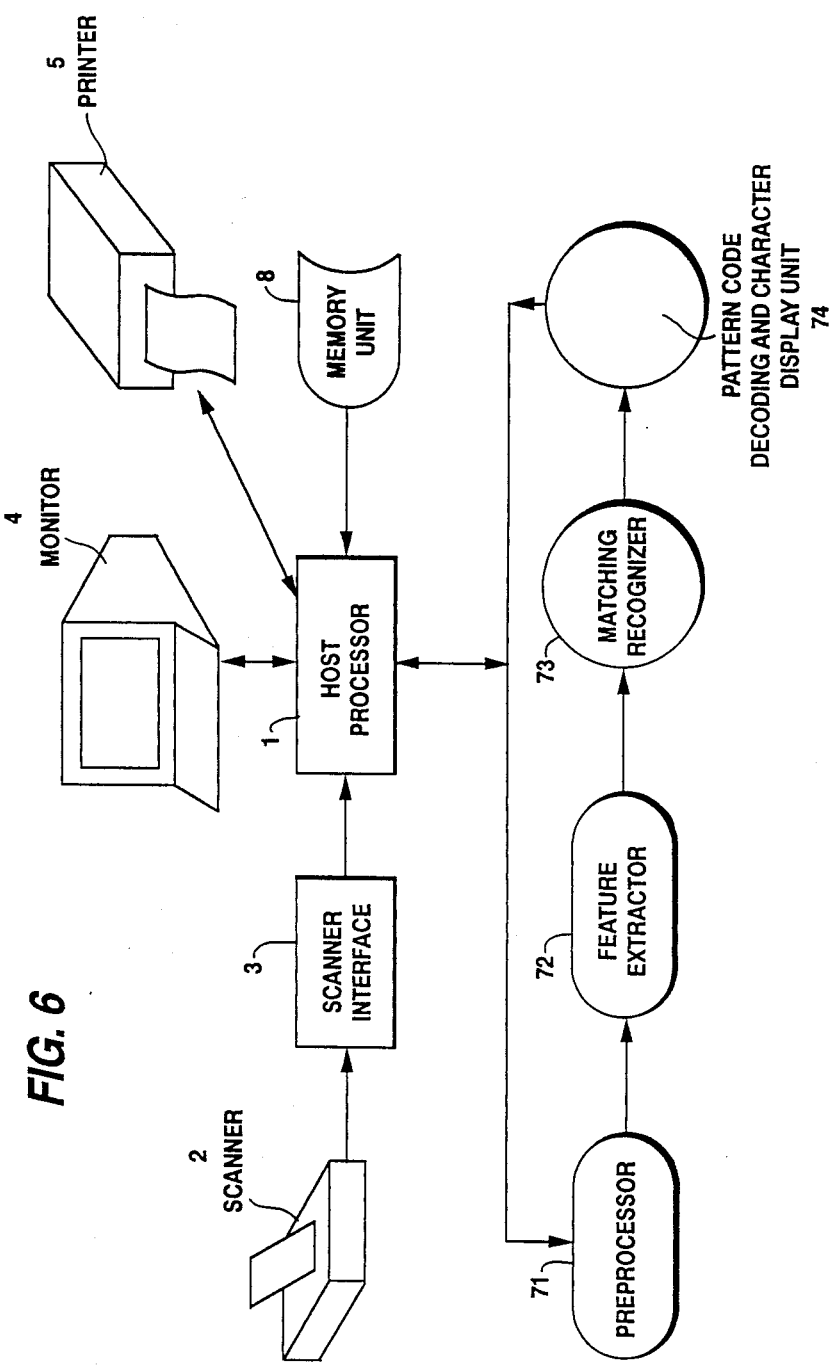
FIG. 6 is a block diagram of the character recognition system of the present invention.

FIG. 6 illustrates the character recognition system of the present invention, which comprises a preprocessor 71 that can convert the data such as the object detecting and the slicing process in the character feature learning system into a chinese character pattern with an identical size; a feature extractor 72 which will extract the features of every character pattern; and a matching recognizer 73. The function of the character recognition system is to have the input character features matched with each of the reference features in the character data base through the pattern code decoding and character display unit 74 so as to indicate the module containing a firmware to assist the host processor to complete the work, since there is a great deal of matching work between the features and the character data base; that matching work would cause the host processor to be overloaded to such an extent that the time element will be affected adversely. In order to share the work load with the host processor, the work of this module is to be done by another CPU, i.e., a matching processor 75, which together with the host processor fulfills the pipeline process; in other words, whenever the host processor receives an input of a character features, that input will be transmitted to the matching processor for further processing; simultaneously, the host processor can process the next input Chinese character immediately. Upon the matching processor completing its recognition work, it will notify the host processor. In accordance with the aforesaid working manner, the efficiency of the system will be elevated substantially.

Figure 7:
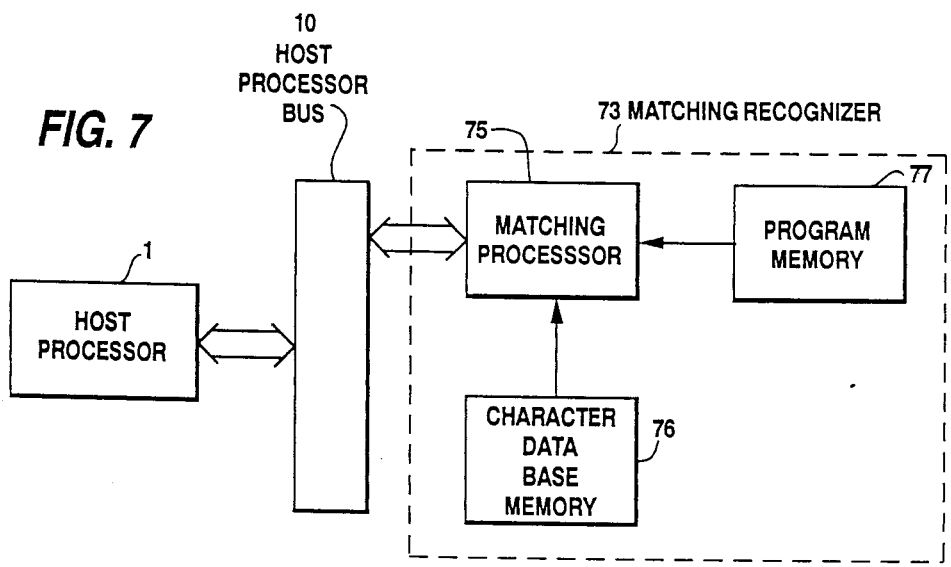
FIG. 7 is a block diagram of the character pattern matching recognizer of the present invention.

FIG. 7 illustrates a block diagram of the matching recognizer. The host processor 1, which transmits the feature data to the matching processor, and which can also retrieve the recognition result from the matching processor.

The matching processor 75, which is substantially a CPU (MC 68000), receives the feature data of an input character, and executes the matching and recognizing programs in the program memory, i.e., matching between the input features and the features stored in character data base memory, and provides a recognizing result; the result will be sent back to the host processor.

A character data base memory 76, which is a memory means to store all of the reference features of characters to be controlled by the matching processor.

A program memory 77, which is a memory means to be controlled by the matching processor, and which stores the program instructions.

A host processor bus 10, which provides intercommunication for data between the host processor 1 and the matching processor 75.

Figure 8:
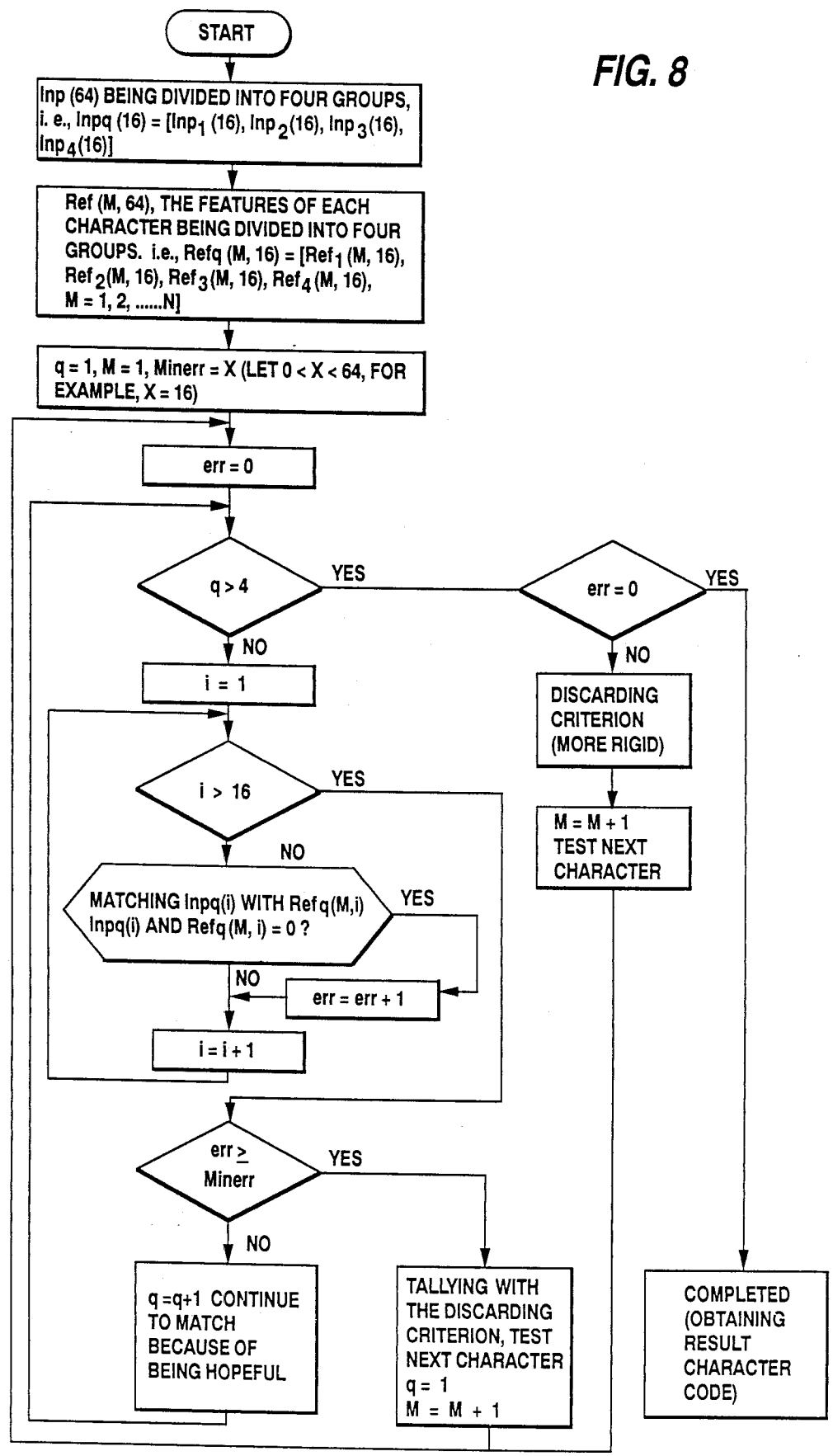
FIG. 8 is the operation flow chart of the character pattern matching recognizer of the present invention.

FIG. 8 illustrates the operational flow chart of the character pattern matching recognizer of the present invention; in order to facilitate the description thereof, the definitions are given as follows:

1. A character is divided into 8 * 8 = 64 lattices, which stand for 64 minor features (each of the minor features includes five bits).

2. In the whole recognizing process, "N" number of printed Chinese character styles can be recognized.

3. If a given character pattern is put in, and its features are extracted, its features are expressed with Inp 64.

4. In the character data base, there "N" number of referencee features, i.e., Ref (M, 64), in which M=1, 2 ... N.

According to the aforesaid definitions, the features of an input character and the corresponding features stored in the character data base are divided into four groups (for example, a character consists of 64 minor features; each group will include 16 minor features). First, use the first group features of the first character in the character data base to perform matching (there are 16 matching operation), and find out the non-matching number (times); then, use that number (or times) to check if that character is a hopefully recognized one, i.e., whether it is tallying with the discarding criterion (the initial) value of thee discarding criterion should be less than 64).

If the accumulative non-matching number is greater than or equal to minimum permitted error number (Minerr), that is tallying with the discarding criterion, the matching for the next group should be discontinued, then the matching process is moving to next reference feature matching. If it is still, so far, a hopeful character in terms of matching, resume the matching with the next group of features, and accumulate the number of non-matching; then, check the number of non-matching, see if it is tallying with the discarding criterion.

If the character is the most hopeful one so far, of which the four groups of features have been matched, and which has the lowest non-matching numbers so far, and in this case, the current discarding criterion should be updated, i.e., the lowest non-matching number to be used as the new discarding criterion. According to the aforesaid method, the discarding criterion will become more rigid so as to discard those characters having little hope and to expedite the recognition process.

In order to expedite the matching process between the features of an input character and the reference features in the character data base, the system according to the present invention performs the matching process by using the logic "AND" instead of using "IF", which is a high-level language being generally used for matching process; however, using logic "AND" has its limitations, i.e., the features have to be expressed with the binary codes "0" and "1". According to the present invention, the features of a character are expressed with five bits. The unit 74 can have the matched and recognized internal code of a character converted into the Chinese character patterns through a character code converting table; then, the character patterns will be displayed in the monitor or the printer.

We claim:

1. A Chinese multifont recognition system for recognizing multifont and multi-sized Chinese characters; wherein a printed Chinese character is input into a computer via a scanning means and then data corresponding thereto is processed through a recognition process and by means of a character feature learning system, the features of a character are stored in a recognition system so as to expand the storage capacity of Chinese characters and allow multifont Chinese recognition, said system comprising:

a host processor to control the execution state of various modules;

a scanner, operatively connected to and controlled by said host processor, which can convert data corresponding to the printed Chinese fonts to be recognized into digital data;

a scanner interface card disposed between said scanner and host processor for providing a transmission means between said host processor and said scanner;

a monitor connected to said host processor for displaying a resultant character pattern;

a printer connected to said host processor for printing said resultant character pattern;

a character feature learning system, connected to said host processor which includes a scanner driver, a text object detector, a slicer, a feature extractor, an operation processor, and a feature encoder connected together; said learning system instructing the computer to learn a given number of Chinese characters to be recognized, and to read in the features of every character so as to establish a feature data base, which is to be used later for matching an input Chinese character;

a character recognition system, connected to said host processor which includes a pre-processor, a feature extractor, a matching recognizer, a matching processor, and a decoder connected together; said character recognition system enabling the character recognized on a paper to be displayed on said monitor or on said printer; and a memory unit connected to said host processor for storing programs and data;

wherein said scanner transmits to said host processor, through a scanner interface card, printed Chinese character pattern data, and then said host processor performs the recognition process through said character recognition system or said character feature learning system; and said memory unit stores the features of the characters and programs to be used as reference data so as to match with the features of a given input Chinese character.

2. A system as claimed in claim 1, wherein said character feature learning system comprises a scanner driver connected to said scanner and said host processor regulates and processes the Chinese data on a paper input to said scanner; and a text object detector connected to said scanner driver and host processor detects the position of every computer character in a line of characters; and a slicer connected to said text object detector and said host processor cuts each input Chinese character into a computer character having the same size; and a feature extractor connected to said slicer and host processor extracts the features of a computer character; and a pattern encoding and features collection means connected to said feature extractor and host processor for converting the character features into an inner code for storage convenience.

3. A system as claimed in claim 1, wherein said feature extractor includes means which can find out the four-direction strokes of a Chinese character, and then divides a character into m * n lattices so as to recognize the direction of a stroke in each lattice before converting the stroke feature into a symbol, which may be a series of "0" and "1" of digital data to represent the features of the lattices; and each character having m * n lattices; and also learning the features of the other printed character patterns through the aforesaid procedures so as to obtain their features respectively; and during a symbolizing process of the features, accumulative requirement being also considered, and all of the features learned being added up with a logic "OR" so as to obtain the features to recognize Chinese characters with a multifont and in various sizes in order to recognize simultaneously all of the printed Chinese fonts learned.

4. A system as claimed in claim 1, wherein said matching recognizer is arranged such that the features of a character to be recognized are equally divided into four groups, which are matched and recognized one by one with the features in the character data base using a logic "AND" operation.

* * * * *